Figure 1:
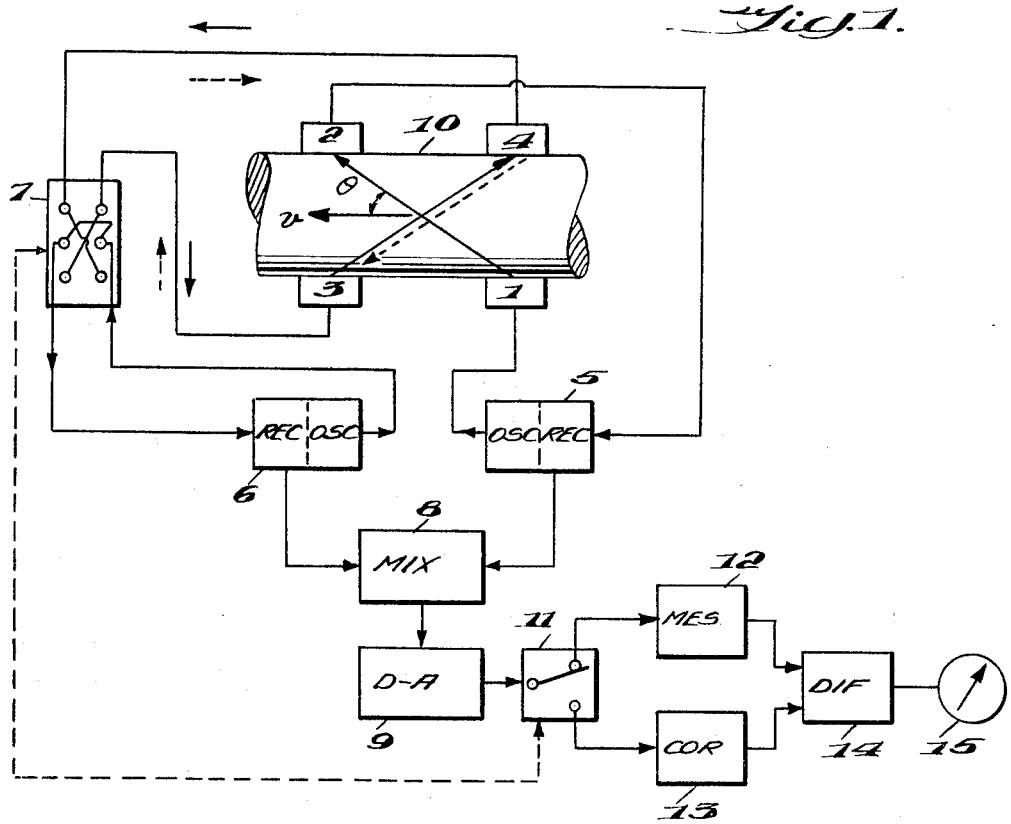

Nov. 1, 1966  MIAKI YAMAMOTO  3,282,101
ULTRASONIC FLOW SPEED MEASURING APPARATUS
Filed Feb. 26, 1964  3 Sheets-Sheet 1

United States Patent Office 3,282,101
Patented Nov. 1, 1966

3,282,101
ULTRASONIC FLOW SPEED MEASURING
APPARATUS
Miaki Yamamoto, Tokyo, Japan, assignor to Tokyo Keiki
Seizosho Company, Limited, Tokyo, Japan, a corporation of Japan
Filed Feb. 26, 1964, Ser. No. 347,444
Claims priority, application Japan, Feb. 27, 1963,
38/8,615
2 Claims. (Cl. 73—194)

This invention relates to ultrasonic apparatus for measuring the speed of flow of a liquid, and is concerned with the provision of improved apparatus—of said category—not requiring use of a direct current amplifier and which measures both low speeds and high speeds of flow.

One of the most typical ultrasonic flow speed, or flow quantity, measuring apparatuses comprises a set of sing-around loop including a transmitter for emitting ultrasonic pulses into a fluid to be measured with a predetermined angle to the direction of the fluid flow, a receiver for receiving the ultrasonic pulses and an electric circuit for electrically amplifying the received signal and causing the transmitter in response to a received pulse to emit a next pulse, and another set of sing-around loop having the same composition as the first set of sing-around loop and having its direction of ultrasonic emission opposite to that in the first set.

In such apparatus, the difference between repetition frequencies in the two sets of sing-around loop, namely, the beat frequency, has a relation with the flow speed resulting in that measurement of this beat frequency makes it possible to know the flow speed. However, if the repetition frequencies in the two sets of sing-around loop are made just equal when the flow speed is zero, then the beat frequency being zero, a direct current amplifier is necessary as a measuring circuit, with the result that the electric circuit becomes complicated. Further, in case the flow speed is low, the beat frequency is also low, and hence when the measurement output is to be derived as a direct current, a smoothing circuit having a large time constant is necessary for smoothing the beat, resulting in that the measurement is only possible with slow response. Furthermore, in practice, since there is a "ziehen" (pull-in) phenomenon between the two sets of sing-around loop, the beat frequency cannot be extremely lowered, and hence the measurement of low speed is impossible.

Since those difficulties bring about serious trouble in the measurement of flow speed, it is proposed to avoid the same by previously providing a difference between the repetition frequencies in the two sets of sing-around loop when the flow speed is zero resulting in that as the flow speed becomes larger, the difference or the beat frequency also becomes larger.

The present invention relates to an ultrasonic flow speed measuring apparatus devised from such point of view as above stated, and has as an object to make possible such measurement of flow speed which is simple in construction and has a high accuracy. A feature of the invention resides in that even when the flow speed is zero, a certain normal value of beat frequency is obtained. Another feature resides in that even while the fluid is flowing, the condition of zero flow speed can be established as desired by switching reversely a set of sing-around loop relative to transmission and reception, to compensate for any deviation of the conditions of the measuring apparatus from normal, thereby always to obtain correct measurement values. Further, during such compensation period, it is preferable in practice that in order to prevent interruption of the measured currents, the measured value just before the compensation period is retained and supplied successively as an output current during the compensation period.

Figure 2:
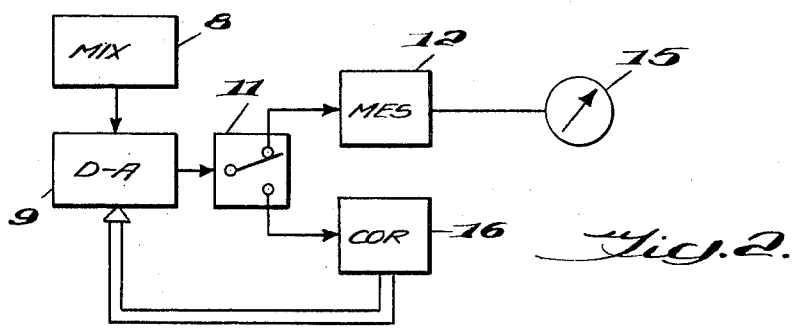
Figure 3:
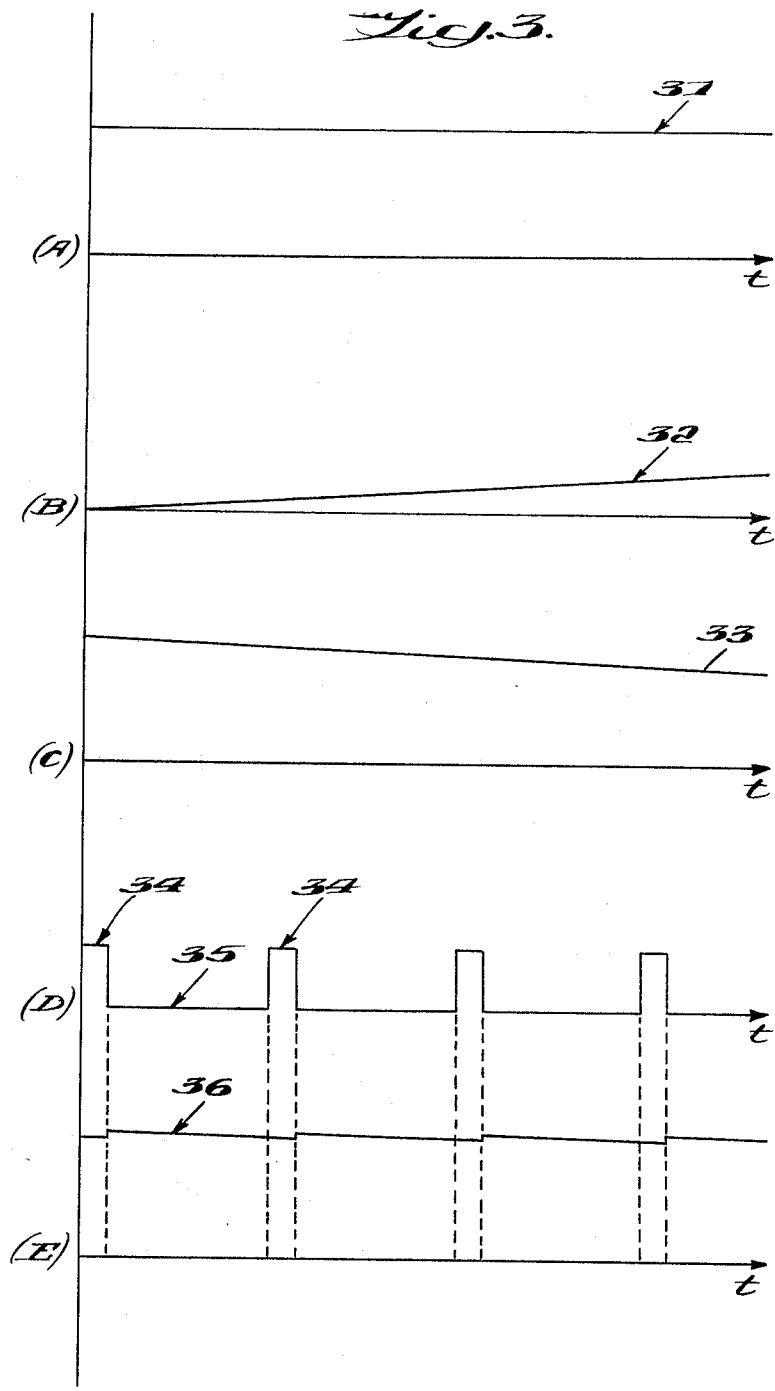
Figures 4, 5:
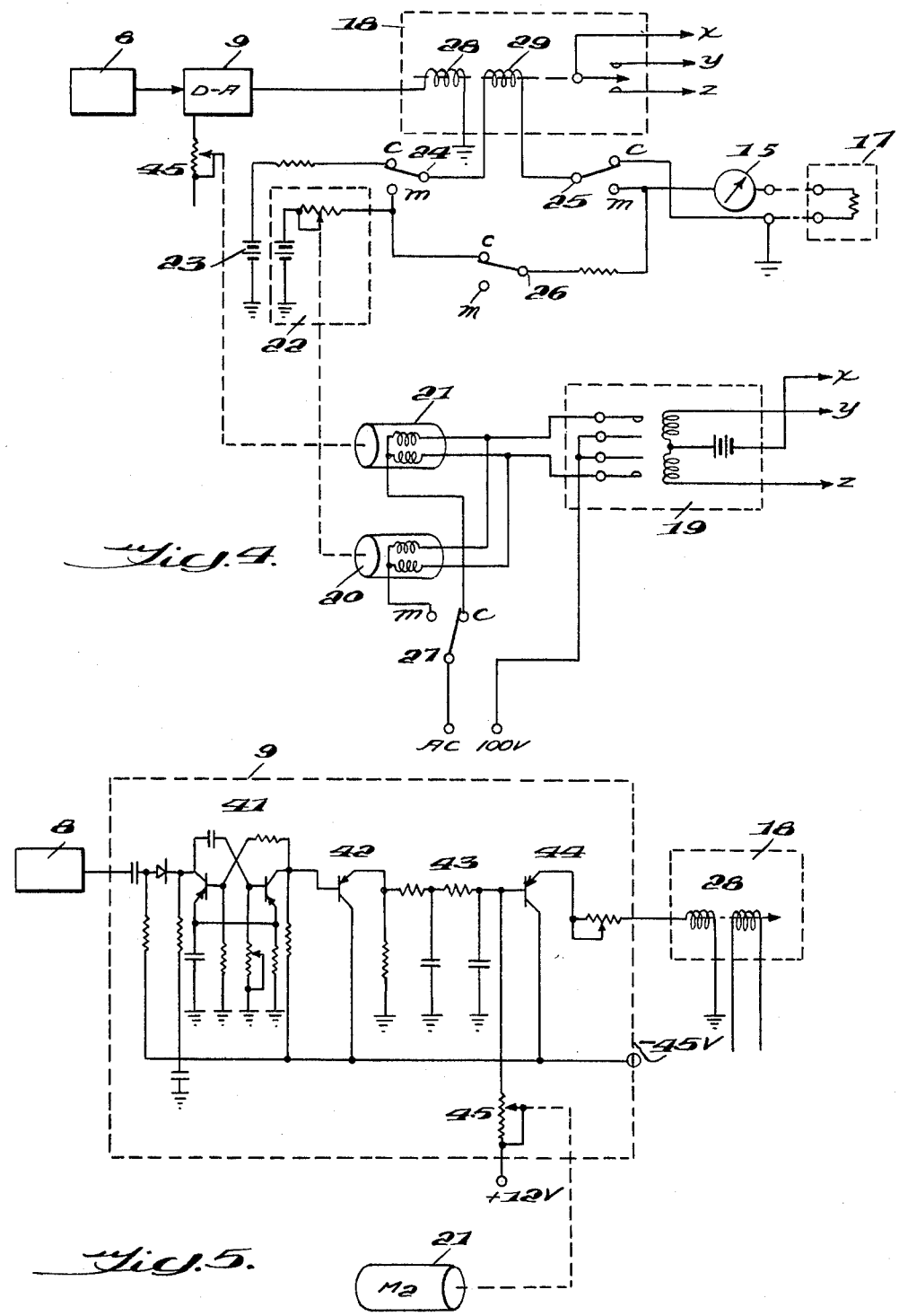

The invention will now be described in greater detail and with reference to the accompanying drawing, in which
FIG. 1 is a block diagram showing an embodiment of the invention;
FIG. 2 is a block diagram showing a modification of a portion of the apparatus shown in FIG. 1;
FIG. 3 is a graphic diagram explaining the function of the invention;
FIG. 4 is an electrical connection diagram showing details of the apparatus of FIG. 2; and
FIG. 5 is an electrical connection diagram showing details of an element used in the invention.

Now, referring to FIG. 1 showing an embodiment of the invention, 10 is a conduit for a fluid to be measured. 1 is a transmitter which emits ultrasonic pulses. These pulses propagate through the fluid with an angle $\theta$ to the flow, and reach a receiver 2. The received signal is amplified in an electric circuit 5 and its electric output causes transmitter 1 to emit next ultrasonic pulses. The electric circuit 5 includes a high frequency oscillator and a receiver amplifier. Thus the above 1, 2 and 5 constitute a set of sing-around loop. Similarly, 3, 4 and 6 constitute another set of sing-around loop, and in this latter set there is provided a transmitter-to-receiver switching device 7, by which transmission and reception can be switched at any desired time. Namely, normally the ultrasonic pulses propagate, as shown by a solid line in FIG. 1, opposite to the flow and in the direction of an angle $\theta$ with it, while in time of inspection of normal (zero) condition the ultrasonic pulses are emitted in the direction along the flow as shown by a broken line. Accordingly, in this case each of 3 and 4 is utilized as both transmitter and receiver. The repetition frequencies produced in the two sets of sing-around loop give rise to a beat frequency in a mixer amplifier 8, which frequency is converted to a direct current in a frequency-to-current converter or digital-to-analog conveter (D-A) 9, whereby an output relating to the flow speed or to the flow quantity is obtained.

The output of D-A converter 9 is supplied through a change-over switch 11 interlocked with the transmitter to receiver switching device 7, in one way to a measured value responsive reservoir 12 and in another way to a correcting value responsive reservoir 13. These reservoirs are so constructed that each of them while connected to converter 9 varies its output in response to the converter output, and while converter 9 is switched to the other way it reserves an output value just before the switching and sends it out continuously, as will be explained in detail hereinafter. The output of these reservoirs 12 and 13, after substracted one from the other in a substractor or differentiater 14, is supplied to an indicator 15.

According to the invention, the repetition frequencies of two sets of sing-around loop produced when the flow speed is zero are provided with a difference by a predetermined frequency. This difference is preferably about 50 cycles per second and it is easily obtained by making the distances between transmitters and receivers slightly different. Now, assuming the flow speed of fluid is V, the acoustic velocity in the resting fluid is C, the distances between transmitters and receivers 1–2 and 3–4 are $l$ and $l+\Delta l$, respectively, and the angle between the direction of ultrasonic pulse propagation and the direction of flow is $\theta$, then the beat frequency $\Delta F$ for the flow speed V when 3 is transmitter and 4 is receiver is:

$$\Delta F = \frac{c+V\cos\theta}{l} - \frac{c-V\cos\theta}{l+\Delta l}$$

$$= \frac{c+V\cos\theta}{l} - \frac{c-V\cos\theta}{l}\left(1-\frac{\Delta l}{l}\right), \text{ (as } \Delta l \ll l\text{)}$$

$$= \frac{2V\cos\theta}{l} + \frac{\Delta l}{l^2}c. \quad \text{(As } V \ll c\text{)} \tag{1}$$

The beat frequency $\Delta c_0$ when 4 is transmitter and 3 is receiver is:

$$\Delta f_0 = \frac{c+V\cos\theta}{l} - \frac{c+V\cos\theta}{l+\Delta l}$$

$$= \frac{c+V\cos\theta}{l} - \frac{c+V\cos\theta}{l}\left(1-\frac{\Delta l}{l}\right), \text{ (as } \Delta l \ll l\text{)}$$

$$= \frac{\Delta l}{l^2} \cdot c \cdot \quad \text{(As } V \ll c\text{)} \tag{2}$$

Therefore the difference of these two frequencies $\Delta f$ is:

$$\Delta f = \Delta F - \Delta f_0 = \frac{2V\cos\theta}{l} \tag{3}$$

from which the flow speed V can be measured.

It is noted from Equation 2 that the beat frequency $\Delta f_0$ obtained in case 4 is transmitter and 3 is receiver is independent of the fluid speed V. Further it is noted from Equation 1 that the beat frequency $\Delta F$ when supposed that the fluid speed V were zero would be $$\frac{\Delta l}{l^2} c$$

which is equal, referring also to Equation 2, to $\Delta f_0$. Anyway, it results that the output of D-A converter 9, in case 4 is transmitter and 3 is receiver, is $\Delta f_0$ representative of the output when supposed that the flow speed were zero, and, in case 3 is transmitter and 4 is receiver, is the sum of the $\Delta f_0$ and $\Delta f$ which latter is proportional to V.

In general, the temperature coefficient of acoustic velocity in a liquid is about or less than 0.3% per 1° C. It may be neglected when the temperature variation is small, but in case the property or composition of liquid is changed, very large variation of acoustic velocity might result, and it is necessary for realizing measurement accuracy to know $\Delta f_0$ during measurement, namely, the beat frequency in the normal condition or at time of flow speed $V=0$. In the invention, in order to practice this automatically, the beat frequency $\Delta F$ produced when 3 is transmitter and 4 is receiver is combined differentially with the beat frequency $\Delta f_0$ produced when 4 is transmitter and 3 is receiver, the latter beat frequency being intentionally made relatively large to an extent, for example, of several ten cycles per second as above stated, in order to facilitate its actual measurement in the same way as the measurement of $\Delta F$, thereby to obtain $\Delta f$ representing actual flow speed V or its converted current value, and to measure the flow speed V. The above described apparatus shown in FIG. 1 is one of its embodiments.

In FIG. 2, representing a modification of a portion of the apparatus shown in FIG. 1, a compensator or corrector 16 produces a mechanical output instead of an electrical output as by compensator 13 in FIG. 1. D-A converter 9 is provided with a mechanical element for adjusting its frequency to current characteristic which is connected to an output mechanical element of corrector 16. In the figure, a dual arrow represents the mechanical coupling. Corrector 16 receives the output of D-A converter 9 and, in response to the electrical input, operates automatically to adjust the mechanical element in the D-A converter so that its electrical output will become zero.

A measurement value responsive reservoir 12 is similar to that in FIG. 1 and its output is in this case introduced solely into indicator 15. In this embodiment, therefore, the above stated function to substract the compensating beat frequency $\Delta f_0$ is effected by the adjustment of characteristic of D-A converter 9. When the correction for variation of acoustic velocity C according to Equation 1 above stated is performed, the adjustment of characteristic of D-A converter 9 may be selected so that the input frequency to output current characteristic curve shifts only up and down while maintaining its inclination constant.

In practice, it sometimes is desired that when the flow speed is zero the indicated current value of indicator 15 be not zero but be a certain definite value, e.g., 1 ma. In that case, D-A converter 9 is connected with corrector 16 in a relation wherein the mechanical input of the former is automatically adjusted by the mechanical output of the latter so that the electrical output of the former or the electrical input of the later is not zero but a predetermined definite value, e.g., 1 ma. An embodiment for that case will be explained in detail hereinunder with reference to FIG. 4.

Now, the principle of automatic zero inspecting mechanism according to the invention will be explained referring to FIG. 3. In the figure, abscissae are time and ordinates A, B, C and E are currents. In FIG. 3(A), 31 represents output current to be obtained when liquid flow speed V is constant, and the same shows that if the characteristic of the measuring apparatus is constant the output current is also constant. 32 in FIG. 3 is an output current in the normal condition or when flow speed $V=0$, and shows the case when it is subjected to a timely change. In such case, as shown in Equation 3, the output current is changed as shown by 33 in FIG. 3(C), with the result that the difference between 31 and 33 will become measurement error. In this invention, in order to avoid this error, inspection of normal conditions is performed during the periods shown by 34 in FIG. 3(D) so that if there is any variation in constants relating to measurement or in characteristic of the measuring apparatus, the same is compensated for to obtain always correct measured values, and during the periods shown by 35 the apparatus is switched to measuring condition for performing the measurement.

In this case it is desired to provide a retaining mechanism such that the output current will not be returned to normal current or zero even when the condition is changed to normal, thereby resulting in that the output current flowing in a load becomes as shown at 36 in FIG. 3(E). It will be understood from this figure that during inspection of normal condition (zero) the current is maintained constant and equal to the current just before inspection, and when the zero inspection is terminated, it is restored to coincide with correct measurement values.

In FIG. 4, which is an electrical connection diagram of an example embodying the block diagram shown in FIG. 2, 18 is a comparing device, 19 is a relay, 20 and 21 each is a servo motor, 22 is a variable current source comprising a constant direct current source and a variable resistor, and 23 is a constant direct current source for supplying a predetermined current, e.g., 1 ma. Each of 24, 25, 26 and 27 is a change-over switch, corresponding to the change-over switch 11 in FIG. 1 or FIG. 2, and hence it is interlocked with the transmitter-to-receiver switching device 7. Further, 17 is another load similar to, and connected in series with, indicator 16 e.g. an automatic recorder, a relay coil for automatic control or the like.

When change-over switches 24, 25, 26 and 27 are thrown to measurement side $m$, since the transmitter to receiver switching device 7 in FIG. 1 is positioned also to its measurement side, the left side coil 28 of the comparing device 18 receives from converter 9 an output in time of measurement, while the right side coil 29 is interposed through $m$ sides of switches 24 and 25 between variable current source 22 and loads 16 and 17. In the comparing device 18, when currents in two coils 28 and 29 are equal, its movable contact is held in the neutral position, and when the two currents are not equal, it comes into contact with upper or lower contact in response to which current of the two is larger, thereby to energize over conductors X, Y and Z upper or lower coil of relay 19, and of which upper or lower contact correspondingly is closed. Then, since change-over switch 27 also is positioned to its $m$ side, servo motor 20 is connected through contacts of relay 19 to A.C. 100 v. source, thereby in response to the closing of either upper or lower contact of relay 19, upper or lower winding of servo motor 20 correspondingly is energized to rotate it correspondingly in the one or in the reverse direction. Rotation of the servo motor is delivered to variable resistor of variable current source 22 to change it, wherein its direction of rotation is so selected that the current of coil 29 is caused to approach the current of coil 28. Thus, when currents of two coils 28 and 29 become equal or in a relation of a definite proportion corresponding to their winding ratio, the movable contact of comparing device 18 is restored to its neutral position to stop motor 20. Therefore, during the period of measurement, variable current source 22 always follows the output current of D-A converter 9 to supply a current equal to or corresponding to it to loads 16 and 17.

Now, when change-over switches 24 to 27 inclusive are thrown to correction side C, coil 28 receives a correcting output current from D-A converter 9 by simultaneous reversing of the transmitter-to-receiver switching device 7, while coil 29 is connected through switches 24 and 25 to a constant current source 23 and furnished with a constant current, e.g., 1 ma. In this case, since switch 27 is positioned on c side, servo motor 21 is connected to contacts of relay 19 and is rotated when currents of two coils are not equal, thereby to vary the value of variable resistor 45 of D-A converter 9, wherein the direction of the variation is such that output of converter 9 or current of coil 28 thereby is made equal to (or, corresponding to) a constant current of coil 29. Thus, during the period of correction, the characteristic of converter 9 is automatically adjusted by varying the value of resistor 45 so that irrespective of variation of input frequency of converter 9 its output current is always maintained constant. Accordingly, it results that during the measurement period, subtraction in accommodation with variation of $\Delta f_0$ above stated is effected automatically.

Also, during the correction period, since changeover switch 26 is positioned on C side, variable current source 22 is connected through it to loads 16 and 17. Further, since servo motor 20 is cut off during this period, the variable resistor of source 22 is maintained constant, holding an ultimate value during the measurement period before switching. Accordingly, current of loads 16 and 17 is not interrupted even during the correction period, holding a measured value before switching. Further, the measured value responsive reservoir 12 in FIG. 1 may be constructed similarly as above. Furthermore, although in the apparatus shown in FIG. 4, since variation of the correcting current is utilized for adjustment of variable resistor 45 of converter 9, means for reserving the correcting current value is not provided, in the apparatus shown in FIG. 1 the correcting value responsive reservoir 13 may be provided with a similar reserving circuit as variable current source 22 and changeover switch 26 shown in FIG. 4 for electrically reserving the correcting value adapted to be subsequently subtracted from the output of reservoir 12 in subtractor 14.

In FIG. 5, which shows the interior connections of D-A converter 9 in detail, 41 is a one-shot multivibrator, 42 is a buffer amplifying transistor, 43 is a smoothing filter circuit, 44 is an output transistor and 45 is a characteristic adjusting variable resistor aforementioned. Normally, when there is no input pulse from mixer amplifier 8, since a right side transistor of multivibrator 41 is conducting, transistor 42 does not conduct due to high potential of its base. In this case transistor 44 is also cut off due to its high potential base, and hence its output current is zero. Now, when input pulses come into multivibrator 41, its conductive condition is reversed with the result that the right side transistor is cut off and hence transistor 42 has its base potential sufficiently lowered to conduct. At a definite time thereafter, since the conductive condition of multivibrator 41 is again reversed to reset, conduction of transistor 42 is then also cut off. Thus, there flows in transistor 42 a rectangular wave form current of the same repetition frequency as the input from mixer amplifier 8 and of a definite short width. This current is smoothed by filter circuit 43 and there flows in resistor 45 a direct current having an averaged value of a series of rectangular form currents as above stated. The voltage drop across resistor 45 due to this direct current lowers the base potential of transistor 44, which is thereby made conductive to generate an output current to the comparing device 18. This smoothed current in resistor 45 is proportional to the number of rectangular waves in transistor 42 in a definite time, resulting in that the output current of converter 9 is varied in a straight line relation with the repetition frequency of its input pulses. Moreover, by varying the value of resistor 45, the characteristic curve representing the relation of input frequency to output current of converter 9 can be shifted up and down without changing the inclination of the straight line which is the characteristic curve. This resistor 45 is driven by an output shaft of servo motor 21 as described above, to vary its value. Thus, the characteristic of converter 9 is automatically adjusted by the output current of the amplifier 8 during the correcting period.

As will be evident from the aforegoing description, according to the invention, such effect is obtained that the measurement of flow speed or flow quantity can be easily and accurately performed.

What I claim is:

1. An ultrasonic flow speed measuring apparatus comprising a set of sing-around loop including a transmitter for emitting ultrasonic pulses into a fluid to be measured in a certain direction with respect to the direction of the fluid flow, a receiver for receiving the ultrasonic pulses and an electric circuit for causing the transmitter in response to the receiving of an ultrasonic pulse to emit a next ultrasonic pulse; another set of sing-around loop having substantially the same composition as the first set of sing-around loop and having the distance between its transmitter and receiver made intentionally slightly different from that in the first set of sing-around loop; an electric circuit for producing a beat frequency between the repetition frequencies of ultrasonic pulses in the two sets of sing-around loop; switching means for reversing at any time the direction of ultrasonic pulse emission in either set of the two sets of sing-around loop; the difference between the transmitter to receiver distances of the two sets of sing-around loop being so selected that the beat frequency produced when the directions of ultrasonic pulse emission are the same with respect to the direction of the fluid flow attains to a predetermined substantial value, at least in the order of several ten cycles per second; and means for combining in an electric circuit the output beat frequency produced when the directions of ultrasonic pulse emission in the two sets of sing-around loop are selected opposite to each other with respect to the direction of the fluid flow differentially with the output beat frequency produced when the directions of ultrasonic pulse emission in the two sets of sing-around loop are selected in the same direction with respect to the direction of the fluid flow.

2. An ultrasonic flow speed measuring apparatus comprising a set of sing-around loop including a transmitter for emitting ultrasonic pulses into a fluid to be measured in a certain direction with respect to the direction of the fluid flow, a receiver for receiving the ultrasonic pulses and an electric circuit for causing the transmitter in response to the receiving of an ultrasonic pulse to emit a next ultrasonic pulse; another set of sing-around loop having substantially the same composition as the first set of sing-around loop and having the distance between its transmitter and receiver slightly different from that in the first set of sing-around loop; an electric circuit for producing a beat frequency between the repetition frequencies of ultrasonic pulses in the two sets of sing-around loop; an electric circuit for converting the beat frequency to a current magnitude; switching means for reversing at any time the direction of ultrasonic pulse emission in either set of the two sets of sing-around loop; and means for automatically adjusting the characteristic of the frequency to current converting electric circuit in response to the output current produced when the directions of ultrasonic pulse emission in the two sets of sing-around loop are selected in the same direction with respect to the direction of the fluid flow, thereby to obtain the flow speed from the output current produced when the directions of ultrasonic pulse emission in the two sets of sing-around loop are selected opposite to each other with respect to the direction of the fluid flow.

References Cited by the Examiner
UNITED STATES PATENTS 2,669,121  2/1964  Garman et al. _____ 73—194.

FOREIGN PATENTS 359,896  3/1962  Switzerland.

RICHARD C. QUEISSER, *Primary Examiner.*

L. R. FRANKLIN, *Assistant Examiner.*